United States Patent

Anderson et al.

Patent Number: 5,251,033
Date of Patent: Oct. 5, 1993

[54] D.C. RESPONSIVE EQUALIZATION FOR TELEVISION TRANSMISSION CHANNEL IRREGULARITIES

[75] Inventors: Bruce J. Anderson, Monmouth Junction; Charles B. Dieterich, Kingston, both of N.J.

[73] Assignee: RCA Thomson Licensing Corporation, Princeton, N.J.

[21] Appl. No.: 851,434

[22] Filed: Mar. 16, 1992

[51] Int. Cl.$^5$ ............................................. H04N 5/21
[52] U.S. Cl. ...................................... 358/167; 358/139
[58] Field of Search ............... 358/186, 187, 139, 167, 358/905

[56] References Cited

U.S. PATENT DOCUMENTS 4,424,533  1/1984  Rzeszewski ................... 358/139 X
5,027,210  6/1991  Beech ............................. 358/167 X
5,065,242  11/1991 Dieterich et al. ................... 358/167

OTHER PUBLICATIONS

"Digital Communication", by E. A. Lee and D. G. Messerschmitt, Kluwer Academic Publishers, Boston, 1988, Chapter 9, pp. 371–401.

Primary Examiner—Victor R. Kostak
Attorney, Agent, or Firm—Joseph S. Tripoli; Eric P. Herrmann; Ronald H. Kurdyla

[57] ABSTRACT

A television signal to be equalized to compensate for transmission channel frequency and phase irregularities includes a test signal. A difference signal representing the difference between the average (DC) value of the test signal and a DC reference component of the television signal is obtained, and a predetermined portion of the test signal is FFT transformed. A ratio of a desired DC difference to the obtained DC difference as represented by the difference signal is developed. A ratio of a desired frequency response to a frequency response indicated by FFT transformed values, excluding DC, also is developed. Values associated with the two ratios are inverse FFT transformed, and the transformed values are used to control the parameters of an FIR filter for equalizing the television signal.

5 Claims, 2 Drawing Sheets

D.C. RESPONSIVE EQUALIZATION FOR TELEVISION TRANSMISSION CHANNEL IRREGULARITIES

FIELD OF THE INVENTION

This invention concerns apparatus for equalizing a television signal to compensate for irregularities in signal parameters caused by transmission channel characteristics.

BACKGROUND OF THE INVENTION

The transmission of an image representative signal such as a television signal through a transmission channel may subject the signal to a variety of disturbances which may alter desired parameters of the signal. In particular, transmission channel characteristics may cause the frequency and phase parameters of the signal to deviate from a desired "flat" characteristic. This result may be produced by both terrestrial broadcast and cable channels, for example.

To compensate for such deviations, i.e., to re-acquire a desired flat frequency and phase response of the signal, a signal equalizer may be used at a receiver. The use of such an equalizer is particularly important with the advent of high definition television systems. In digital systems multiple-tap FIR filters are employed by the equalizer apparatus. For removing signal distortions an equalizer may compare a test signal, which is incorporated in the received signal, with a programmed ideal or desired version of the test signal to configure a filter at the receiver so as to remove or compensate for the irregularities in the received television signal. The test signal may be in the form of a pseudorandom number (PRN) sequence as described, for example, in U.S. Pat. No. 5,065,242—Dieterich in the context of deghosting apparatus for a television receiver.

It is herein recognized that an accurate determination of the received signal's average or DC level is important for fast Fourier transform (FFT) ratio equalization. Failure to properly determine the DC level can lead to improperly set DC gain, which can produce what appear to be image "smudges" in a displayed image. Illustratively, this effect will cause a display of a person situated against a flat field background to be surrounded by a "glow" or "shadow". Depending upon equalizer design, this effect can be centered on the displayed image or offset to one side, and is basically due to a very low frequency signal component produced by an offset in all tap values of the equalizer filter resulting from mis-measured DC characteristics.

SUMMARY OF THE INVENTION

Equalizer apparatus according to the principles of the present invention exhibits improved low frequency operating characteristics. In an illustrated preferred embodiment, this is accomplished by separately calculating the DC response of the signal to be equalized using a non-transform technique, independent of a transform (e.g., a fast Fourier transform) of the signal to be equalized.

In an illustrated embodiment of the invention, a television signal to be equalized to compensate for transmission channel frequency and phase irregularities includes a test signal. The test signal is a pseudorandom number (PRN) sequence disposed in a predetermined line of the vertical blanking interval. A sample of 256 points in the PRN test signal sequence is taken. A difference signal is generated, representing the difference between the average (DC) value of the test signal sample and a DC reference component of the television signal (e.g., the horizontal back porch DC level). The test signal sample is frequency transformed by a 256 point FFT unit. A DC frequency sample output of the FFT unit is not used. The remaining 255 frequency samples from the FFT output are applied to a frequency ratio unit, another input of which receives the difference signal. This unit develops a value representing a desired-to-actual ratio with respect to the difference signal, and values representing desired-to-actual ratios for each of the remaining 255 FFT frequency samples. The 256 ratio values are inverse FFT transformed to the time domain, and the central 128 transformed values are applied to control taps of a 128 tap FIR filter to determine the operation of the filter for equalizing the television signal.

DETAILED DESCRIPTION

Figure 1:
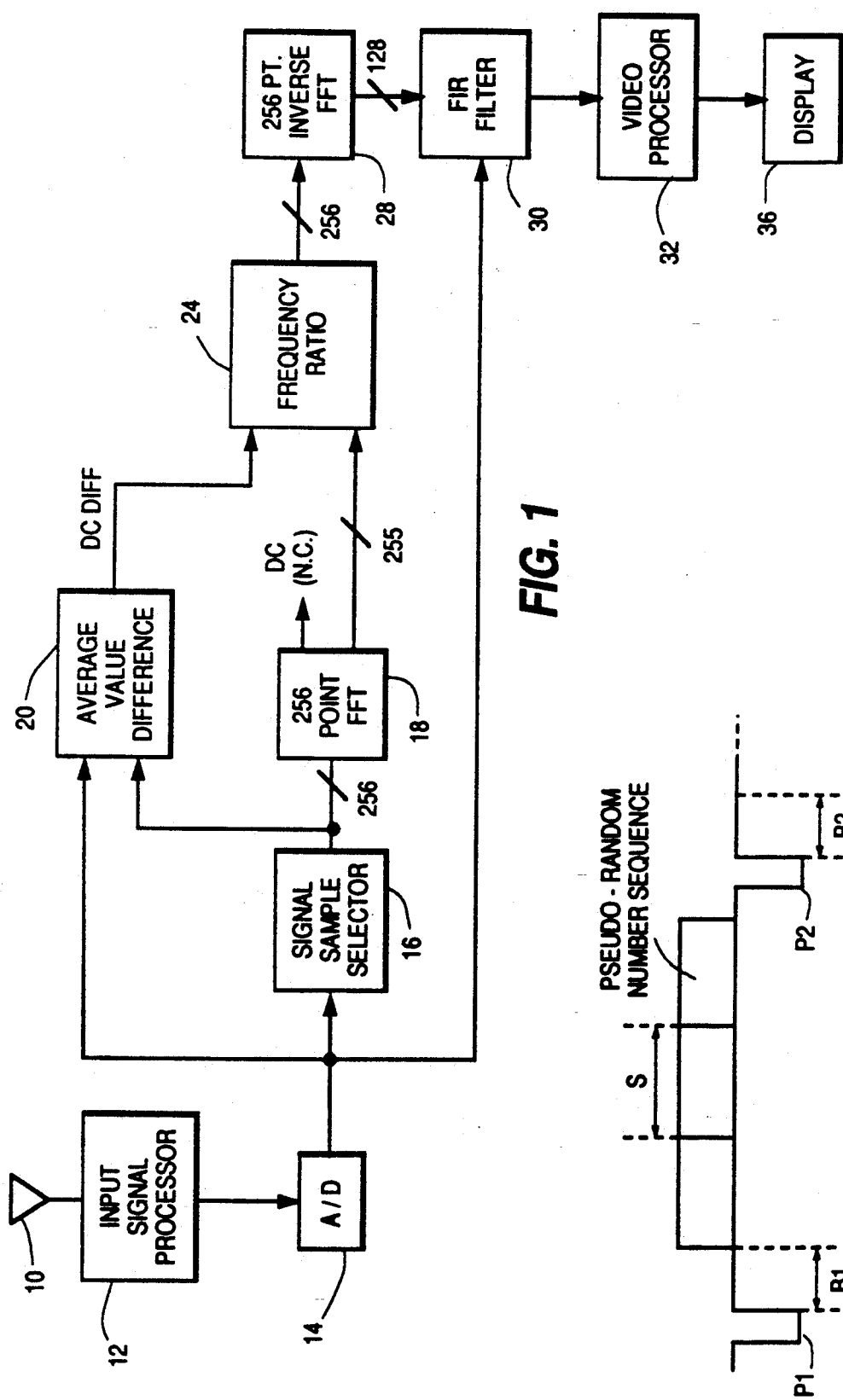
FIG. 1 is a block diagram of a portion of a television receiver including equalizer apparatus according to the present invention.

In FIG. 1 an analog television signal conveyed over a broadcast transmission channel is received by an antenna 10 and is processed initially by an input signal processor 12. Processor 12 contains conventional circuits including a tuner, radio frequency processor, mixer, intermediate frequency processor and demodulator to produce a baseband video signal. The baseband video signal is converted to digital form by an analog-to-digital converter 14. The digital video signal is applied to inputs of a signal sample selector 16, an average value difference determining network 20, and a signal input of a 128 tap FIR filter 30.

Figure 2:
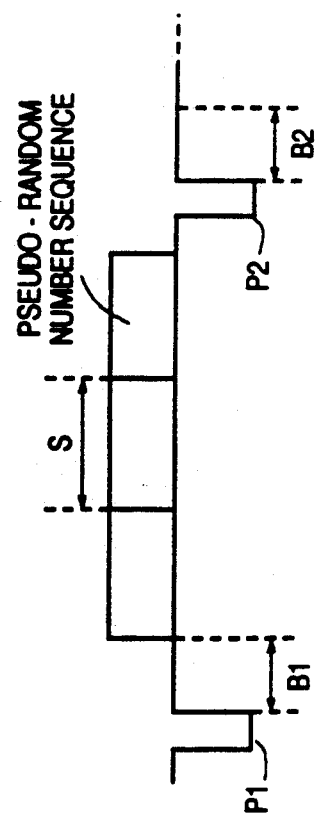
FIG. 2 is a waveform depicting a test signal, comprising a pseudorandom number sequence, incorporated in a television signal to be equalized.

Unit 16 selects 256 samples of a PRN test signal included in the received television signal. The test signal is disposed in a predetermined line in the vertical blanking interval and comprises a three repetition PRN sequence. Such a test signal is described in detail in U.S. Pat. No. 5,065,242, and is illustrated generally in FIG. 2. The test signal shown in FIG. 2 includes a sequence of three pseudorandom number sequences during the active portion of a horizontal line in the vertical blanking interval, between successive horizontal blanking "back porch" intervals B1 and B2 and associated sync pulses P1 and P2.

In this example unit 16, e.g., including a serial input RAM, selects 256 samples S from the central portion of the PRN sequence, i.e., associated with the middle PRN sequence. Other sampling arrangements are also possible. The output 256 samples from selector 16 are applied to a second input of difference unit 20, and to a 256 point fast Fourier transform (FFT) unit 18 for converting the sampled information from the time domain to the frequency domain. Difference unit 20 determines the difference between the average value (i.e., the DC value) of the 256 samples from unit 16, and the average value during the horizontal blanking intervals. In this example the average value during the horizontal blanking intervals is obtained by averaging the values appearing during horizontal blanking intervals B1 and B2 (e.g., 32 samples each). Using the average of both back porch values improves DC measurement accuracy and immunity from "tilt" due to RF and IF gain changes. A DC difference representative signal DC DIFF is produced at the output of unit 20. Difference unit 20 may include an accumulator with feedback for accumulating values over the desired intervals.

FFT unit 18 develops the Fast Fourier Transform, $F(\omega)$, of the 256 sample PRN reference signal. In so doing it produces a plurality of 256 transform coefficients and stores them in a buffer memory. In general these coefficients represent the frequency content of the transformed signal. One of the coefficients represents a DC value of the transformed signal, however this coefficient will not be utilized. Rather, the DC DIFF difference developed by unit 20 is substituted for this coefficient. The remaining 255 coefficients developed by unit 18 and the DC DIFF difference representative signal from unit 20 (which is not FFT transformed) are applied to unit 24.

Unit 24 performs the function $X(\omega)/F(\omega)$, where $X(\omega)$ is the Fourier transform of an undistorted replica of the PRN reference signal. The DC coefficient of the function $X(\omega)$ is selected to comport with the value DC DIFF for an undistorted signal. The ratio $X(\omega)/F(\omega)=G(\omega)$ corresponds to the required frequency response of a filter for equalizing the received signal. The inverse FFT of the function $G(\omega)$ is a function $g(t)$, which represents the time domain response of the desired equalizing filter. The reader is directed to "A Tutorial On Ghost Cancelling In Television Systems" by W. Ciciora et. al., published in the IEEE Transactions on Consumer Electronics, Vol. CE-25, February 1979, pages 9-44, for details of the theory of frequency domain processing for determining the characteristics of equalizing (deghosting) filters.

The function $G(\omega)$ includes 256 coefficients which are applied to an inverse FFT unit 28. Unit 28 develops the function $g(t)$ comprising 256 coefficients. These coefficients correspond to the tap weights of a 256 tap equalizing transversal filter 30 which will correct for transmission channel distortions. Nominally the function $g(t)$ is recurrently calculated in respective signal receivers and the coefficients are used in a known manner to program/update an adaptive equalizing filter 30 of the Finite Impulse Response (FIR) type. If the equalizing filter is to be used for correcting only close-in ghosts for example, the filter may be shortened and realized by using a subset of the coefficients as tap weights. For example to realize a symmetric filter response one may select 128 of the tap values symmetrically about the coefficient representing the DC term and appropriately normalizing or adjusting the selected coefficients to compensate for the amplitude contributions to the filter response of the coefficients that are not utilized.

With the operating characteristics of filter 30 being tailored in response to the signals from unit 28, a frequency and phase equalized video signal appears at the output of filter 30. This video signal is processed by conventional circuits in a video processor 32, e.g., including brightness, contrast and peaking control networks. Finally, the processed video signal is applied to a display stage 36 including an image display device.

Figure 3:
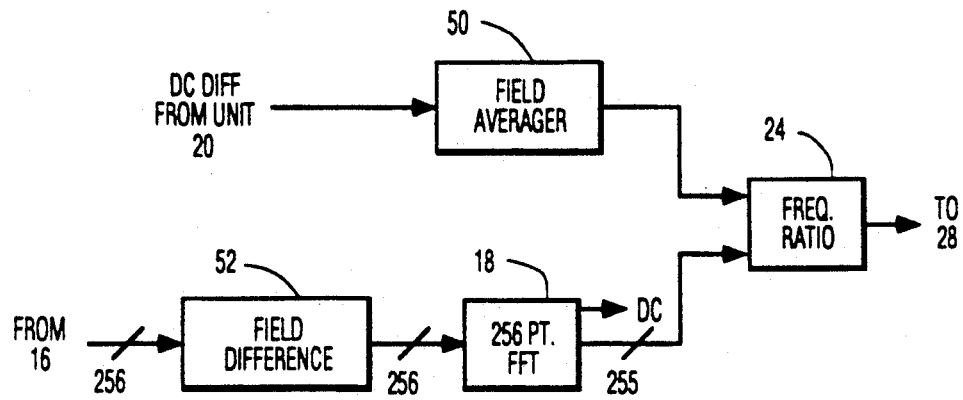
FIGS. 3 and 4 are block diagrams of alternative equalizer arrangements according to the principles of the present invention.

FIG. 3 shows an alternative equalizer arrangement. This arrangement addresses the situation where the test signal is inverted on alternate fields, whereby the mutually inverted test signals can be subtracted from each other (differenced) to improve the accuracy of the 256 selected samples. The DC measurement is not obtained from the differenced signal. Instead, it is obtained as the average of the DC differences computed on each of the signal lines.

In FIG. 3, DC difference representative signal DC DIFF, developed as discussed in connection with FIG. 1, is applied to a field averager 50. Unit 50 averages signal DC DIFF over the two successive fields over which the test signal inverts. A unit 52, which receives an input signal from unit 16 (FIG. 1), determines the difference between the value of the test signal during one field, and the value of the inverted test signal during the next field. Since the reference signal is inverted in successive fields the reference signals add constructively in the differencing operation while the DC level is cancelled. The 256 sample difference representative output of unit 52 is transformed by the 256 point FFT unit 18, the output of which is applied to frequency ratioing unit 24 together with the output signal from unit 50. Subsequent signal processing occurs as in FIG. 1.

Figure 4:
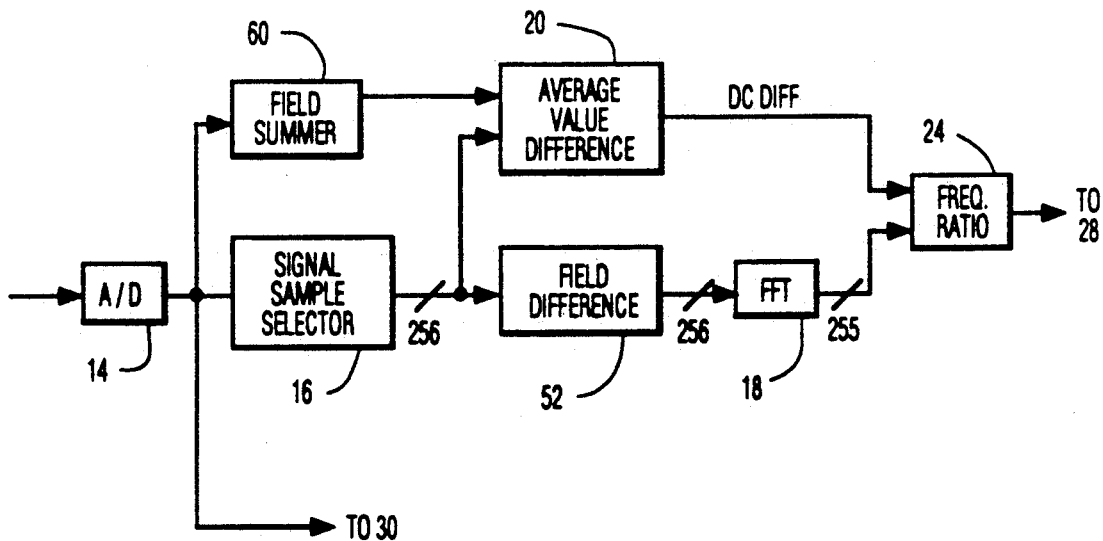

The arrangement of FIG. 4 addresses the fact that, because the test signal sequences are of opposite polarities on successive fields, the DC value can be obtained by adding successive field PRN sequences together. The PRN sequences cancel except for a residue representing a DC error.

In FIG. 4 a field summer is added between units 14 and 20, and unit 52 is as shown in FIG. 3. In FIG. 4 signal DC DEFF is applied directly to unit 24 together with the output of FFT unit 18. Signal processing otherwise is as in FIG. 1.

The described equalizer system can operate with other types of test signals with different waveforms and sequence lengths, and video signal DC information can be derived from other areas of the signal. Also, the input signal to be equalized, e.g., the signal samples from unit 16 in FIG. 1, advantageously may be provided from the output of a deghoster filter such as disclosed in U.S. Pat. No. 5,065,242, to help prevent long ghosts of sync pulses from contaminating the blanking interval DC measurement.

The concept of substituting a measured DC value for a transformed DC value is not limited to the DC coefficients of the FFT, and should not be so construed in the claims. For example in video signal compression apparatus which utilizes Discrete Cosine Transforms (DCT), the DCT DC coefficients of luminance components may be substituted with DC values measured in the time domain to provide greater immunity from noise corruption of the DC level.

What is claimed is:

1. In a system for receiving a video signal subject to exhibiting phase or frequency irregularities attributable to transmission channel characteristics, equalizer apparatus for compensating for said irregularities, comprising:

transform means for providing a transformed video signal;

DC response providing means for providing a signal representative of a DC response of said video signal, independent of said transform of said video signal;

ratioing means responsive to said representative signal and to said transformed video signal for providing an output signal containing values representing ratios of desired to actual values for said DC representative signal and for said transformed video signal; and filter means having a signal input for receiving said television signal, and a control input for receiving said output signal from said ratioing means to determine the operation of said filter for equalizing said video signal.

2. Apparatus according to claim 1, wherein
said video signal contains a test signal within a predetermined interval; and
said DC response providing means and said transform means respond to said test signal.

3. Apparatus according to claim 1, wherein
said test signal is constituted by a pseudo-random number sequence;
said transform means performs a fast Fourier transform (FFT); and
said filter means is an FIR filter.

4. Video signal processing apparatus comprising:
frequency transform means for generating spectral coefficients of a portion of a time domain video signal, said spectral coefficients including a DC coefficient;

means, exclusive of said transform means, for measuring a DC characteristic of said portion of the video signal and providing a DC value representing said DC characteristic;

means for substituting said DC value for said DC coefficient generated by said transform means; and means for processing said spectral coefficients with said substituted DC value.

5. In a video signal processing system for modelling the characteristics of a transmission channel, of the type which includes frequency transform means for generating spectral coefficients, including a DC coefficient, of a transmitted and received reference signal, and means for processing these spectral coefficients; an improvement comprising:

means, exclusive of said transform means for determining a DC characteristic of said transmitted and received reference signal, and generating a DC value representing said DC characteristic; and means for substituting said DC value for said DC coefficient.

* * * * *